United States Patent [19]

Bogdan et al.

[11] 3,713,617
[45] Jan. 30, 1973

[54] SELF LEVELING TRACTOR SEAT
[75] Inventors: Louis J. Bogdan, Davenport, Iowa; Jere S. Culp, Elkhart, Ind.
[73] Assignee: Kelsey-Hays Company, Romulus, Mich.
[22] Filed: Aug. 26, 1970
[21] Appl. No.: 67,125

[52] U.S. Cl. ...................248/371, 248/180
[51] Int. Cl. ..............................A47c 7/00
[58] Field of Search......248/371, 376, 372, 398, 382, 248/180, 188.2, 188.3; 280/6 R, 6 H; 114/193

[56] References Cited

UNITED STATES PATENTS

| | | | |
|---|---|---|---|
| 3,341,165 | 9/1967 | Taylor | 248/376 |
| 2,872,200 | 2/1959 | Kroll | 280/6 H |
| 3,315,934 | 4/1967 | Taylor | 248/382 X |
| 2,572,910 | 10/1951 | Brown | 280/6 H |
| 3,021,107 | 2/1962 | Salo | 248/376 |

*Primary Examiner*—J. Franklin Foss
*Attorney*—Harness, Dickey & Pierce

[57] ABSTRACT

A self leveling seat assembly for tractors and the like comprised of a self-contained leveling unit which is simply connected to a tractor chassis by single bolt connection means, and wherein said self-contained leveling unit includes sealed therewithin a closed fluid filled loop with a single opposed piston in series within the loop. The seat is leveled by an operating force resulting from the weight upon the seat which is connected to the piston in a manner such that the weight causes the piston to displace the fluid in the loop in a direction which enables leveling of the seat.

10 Claims, 5 Drawing Figures

INVENTORS
Louis J. Bogdan,
Vere S. Culp
BY Harness, Dickey & Pierce
ATTORNEYS

INVENTORS.
Louis J. Bogdan,
Vere S. Culp.
BY Harness, Dickey & Pierce
ATTORNEYS

SELF LEVELING TRACTOR SEAT

BACKGROUND OF THE INVENTION

This invention broadly relates to a self leveling seat for tractors and the like. In another aspect this invention relates to a self leveling assembly for a device such as a seat which is required to be kept in a level position relative to a moving base member such as a tractor chassis.

Prior art self leveling tractor seat devices are exemplified in U.S. Pat. No. 3,315,934 of O. Q. Taylor, U.S. Pat. No. 3,341,165 of O. Q. Taylor and U.S. Pat. No. 3,021,107 of K. C. Salo.

In the past, prior art devices used for tractor seat leveling have had numerous problems and disadvantages which prevented the prior devices from achieving true acceptance. In particular prior art self leveling tractor seats have utilized too many external parts and required numerous mounting connections to the tractor chassis in order that the prior devices could be adapted for actual usage. Furthermore the prior devices were too easily tampered with due to externally located, easily accessible, linkage parts between the tractor chassis, the self leveling assembly, and the tractor seat. Also the fact that prior devices were possessed of externally located mechanical linkages and the fact that they used a relatively high number of such linkages led to the fact that they were not sufficiently rapid or accurate in plumbing back to a level position, because in effect the linkages led to a "stretching" within the linkage systems which was detrimental to rapid accurate leveling of the tractor seat. Prior devices also have not possessed any technically appropriate damping mechanism, and this led to a tendency for prior self leveling tractor seats to "hunt" for the proper level position when the tractor was moving along or over an inclined surface. Still further with the prior art devices, when the tractor encountered external recurrent successive rough movements, there was a tendency for the prior devices to permit sympathetic movement within their leveling systems and this led to an over correcting or over movement of the tractor seat in its search for a return to the proper level position. Lastly, numerous of the prior self leveling devices for tractor seats has external flexible tubes or hoses making up a part of their closed loop fluid system and these external tubes or hoses were frequently subject to breakage, cutting, or puncturing which was of course very disadvantageous to proper operation.

Accordingly, it is an object of this invention to provide an improved self leveling seat for tractors and the like.

Another object of the present invention is to provide a self leveling assembly for use with tractor seats and the like wherein the assembly can be simply bolted to the tractor without the need or use of externally accessible linkages or externally accessible tubes or hoses or any other externally accessible parts which would be subject to tampering, breakage, etc.

Another object of the present invention is to provide an improved self leveling seat for tractors which includes a unique self-contained unit which brings about the leveling action.

Another object of the present invention is to provide an improved self leveling assembly for tractors and the like which makes use of a single opposed piston design wherein the single opposed piston is enclosed within a self-contained unit which is essentially tamper proof.

Another object of the present invention is to provide an improved self leveling assembly for tractor seats and the like which assembly utilizes a closed loop fluid system positioned entirely within a self-contained leveling unit.

Still another object of the present invention is to provide an improved self leveling assembly for tractor seats and the like which assembly includes a unique non-symmetrical damping mechanism which reduces and prevents the possibility of synchronous oscillatory motion occurring in the self leveling assembly, thus permitting the self leveling assembly to rapidly reattain the level position when the assembly passes over inclined terrain.

Other objects, features and advantages of the present invention will become apparent from the subsequent description and the appended claims taken in conjunction with the accompanying drawings.

SUMMARY OF THE INVENTION

Figure 1:
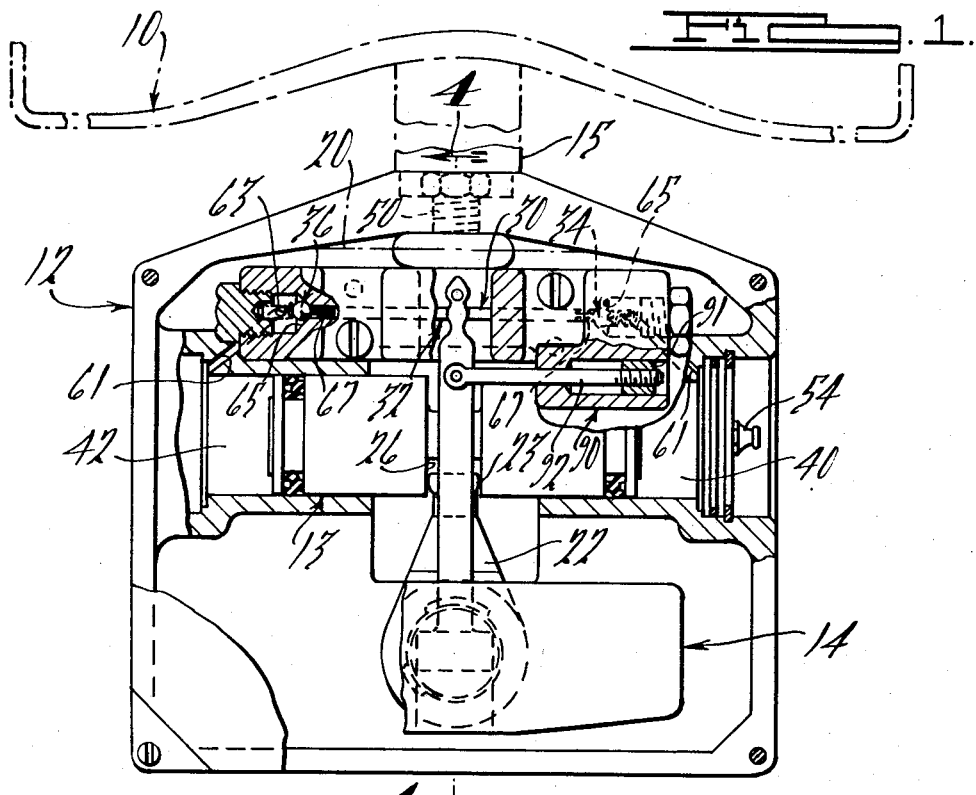
FIG. 1 illustrates an upright partially cutaway view of the self leveling tractor seat of this invention in the level or neutral position.

Briefly stated the present invention comprises a self leveling seat assembly for a tractor vehicle and the like, comprising, self-contained leveling unit, a seat mounted on one part of the unit, means on the unit for mounting the unit on the vehicle, said leveling unit being of generally sealed structure and including therewithin, a closed, fluid filled, loop, single opposed piston means connected in said loop and operable to displace the fluid selectively in either direction within the loop, valve means connected in said closed loop in series with the piston means and operable to normally prevent displacement of the fluid in said loop when the seat is substantially level, a tilt responsive actuator means operable upon tilting of the seat in either direction to open the valve means and permit the fluid in said loop to be displaced by said piston means in a direction to level said seat and said valve means being further operable to prevent displacement of the fluid in the opposite direction within said loop after the seat reaches the level position, and wherein said assembly is leveled by an operating force resulting from the weight upon the seat which is connected to the piston means whereby the weight causes the piston means to displace the fluid in the loop in a direction to level said seat.

In another aspect, briefly stated, this invention comprises a self leveling assembly for a device required to be kept in a level position relative to a moving base member, comprising, self contained leveling unit, means for mounting the device on one part of the unit, means on the unit for mounting the unit on the base member, said leveling unit being of generally sealed structure and including therewithin, a closed, fluid filled, loop, single opposed fluid displacement means connected in said loop and operable to displace the fluid selectively in either direction within the loop, valve means connected in said closed loop in series with the piston means and operable to normally prevent displacement of the fluid in said loop when the device is substantially level, a tilt responsive actuator means operable upon tilting of the device in either direction to open the valve means and permit the fluid in said loop to be displaced by said displacement means in a direction to level said device and said valve means being further operable to prevent displacement of the fluid in the opposite direction within said loop after the device reaches the level position, and wherein the device is leveled by an operating force resulting from the weight upon the device which is connected to the displacement means whereby the weight causes the piston means to displace the fluid in the loop in a direction to level the device.

DESCRIPTION OF PREFERRED EMBODIMENTS

FIGS. 1–5 illustrate a self leveling tractor seat wherein the seat 10 is shown mounted on and in fixed relationship relative to a self-contained leveling unit 12 which, briefly, includes and contains therewithin a single opposed piston 13 and a pendulum actuator 14.

Figure 4:
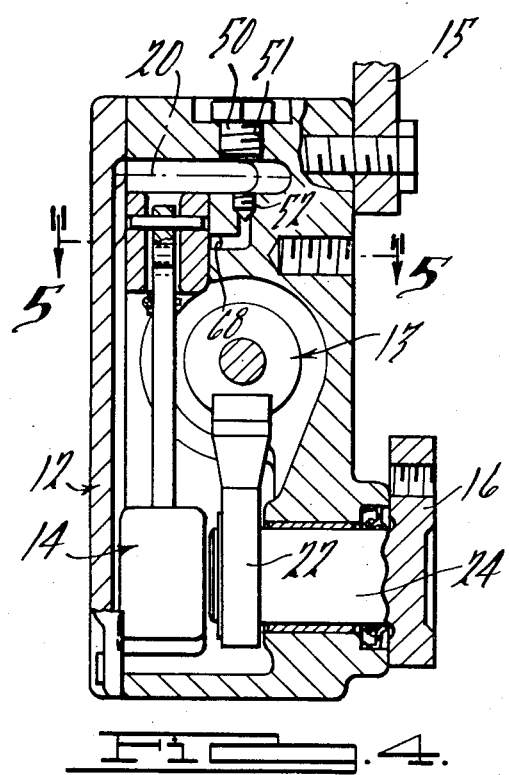
FIG. 4 illustrates a cross-sectional view taken along the line 4—4 of FIG. 1; and, FIG. 5 illustrates a cross-sectional view taken along the line 5—5 of FIG. 4.

Mounting of the tractor seat 10 on a tractor, not shown, is best seen in FIG. 4 wherein the seat mounting bracket 15 is used to hold the tractor seat 10 and, the self-contained leveling unit 12 is mounted to the tractor chassis through use of a connection bracket designated 16 which is fastened to the chassis through use of any suitable connection means such as one or more threaded bolts or the like.

The construction of the self leveling seat assembly is as follows. The leveling unit 12 includes a reservoir of fluid sealed therewithin as indicated by the liquid level 20. Disposed within the reservoir of fluid in the leveling unit 12 is a rocket arm or fixed abutment member 22 which is fixedly connected to the tractor chassis through the shaft 24 and the tractor chassis connection bracket 16. The fixed abutment 22 has an end portion thereon designated 23 which is seated within a grooved out or annular recess portion 26 intermediately positioned on the single opposed piston 13.

The pendulum actuator 14 moves freely with respect to the rocker arm or fixed abutment member 22 in a back and forth direction dependent upon the tilt to which the leveling unit 12 is exposed. When the pendulum 14 tilts in one direction, for example to the right, it actuates the right hand push rod member designated 30, which is the same as the left hand push rod member designated 32 except for the difference between right and left hand orientation. The push rod members 30 and 32 when actuated serve to open the respective check valves designated 34 and 36.

The single opposed piston 13 is of the double acting or double ended type and fluid chambers 40 and 42 respectively are formed at each end of the double ended piston 13.

Figure 5:
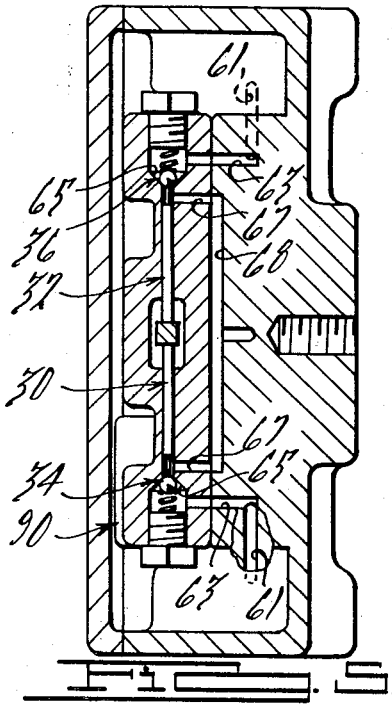

A closed loop for a fluid circuit is formed within the leveling unit 12 by the following parts. Firstly the single opposed piston 13 is in series within the loop and communication from the fluid chamber 40 at the right end of piston 13 over to the fluid chamber 42 at the left end of piston 13 is made through the fluid circuit (as best seen in FIG. 5) by the corresponding conduits 61, the corresponding conduits 63, the corresponding check valve housing chambers 65, the corresponding conduits 67, and the cross over conduit 68. Each of the corresponding elements 61, 63, 65 and 67 are identical in structure except for the difference between right and left hand orientation.

The procedure for filling the fluid reservoir with fluid up to the level 20 is carried out by removing the cap or closure member 50 and the plug 52 as best seen in FIG. 4. Oil or other suitable fluid material is then introduced into the closed loop as follows. First oil is introduced through the check valve 54 as shown in FIG. 1 to initiate the filling of the fluid chamber 40 at the right hand end of the piston 13. In order to complete filling of the chamber 40 the leveling unit 12 is tilted slightly to the right in order that the pendulum will open the right hand check valve 34 and this enables the fluid chamber 40 to be filled with oil and the excess of oil then flows up through the right hand conduits 61, 67 and 68 until the oil overflows through the opening for the plug 52. Once the overflow is observed it is known that the right hand side of the closed loop is filled with oil and then in a similar fashion a check valve (not shown) which communicates with the second fluid chamber 42 at the left hand side of the piston 13 is filled with oil in a similar fashion. Then upon the closed loop being filled with oil the plug 52 is reinserted to close off the loop. Subsequent to this the entire inside of the self-contained leveling unit 12 is filled with oil through the opening 51, such that the liquid level rises to a level designated 20 and then the cap 50 is replaced in the opening 51 to seal off the reservoir. It should be understood that there is a slight amount of leakage between the closed loop and the reservoir of fluid 20, due to the fact that the parts making up the leveling unit 12 are not exactly flush fitting, and this slight amount of leakage back and forth between the closed loop and the reservoir fluid 20 affords an assurable solid action and positive fluid linkage in the operation of the assembly, particularly because the unit 12 being essentially filled with fluid prevents the detrimental presence of trapped air or gases in the closed fluid filled loop.

OPERATION

The operation of the self leveling seat assembly in accordance with this invention is as follows.

On level terrain the position of the tractor seat 10, the leveling unit 12, the pendulum actuator 14, the single opposed piston 13 and the rocker arm or fixed abutment member 22 which represents the up and down axis of the tractor chassis, would all be as shown in FIG. 1.

Figure 2:
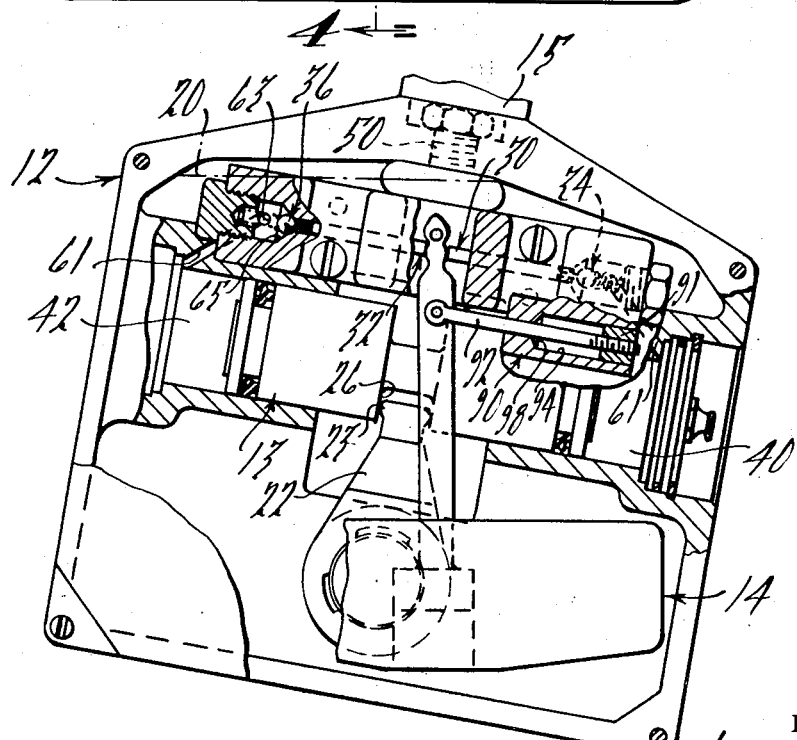
FIG. 2 illustrates the structure of FIG. 1 when the tractor is driven across a tilted or downwardly inclined left to right terrain.

Upon the tractor being driven along a left to right inclined slope such as encountered in a ditch or furrow, the tractor seat would be tilted to the right, and the leveling unit 12, the pendulum actuator 14, and the abutment member 22, would also be tilted to the right as shown in FIG. 2. Upon tilting of the pendulum actuator 14 to the right as shown in FIG. 2 the push rod member 30 would also be pushed to the right and would open the check valve 34. Upon opening of the check valve 34 this would permit initiation of the flow of oil from the fluid chamber 40 up through the conduits 61, 65, 67.

Figure 3:
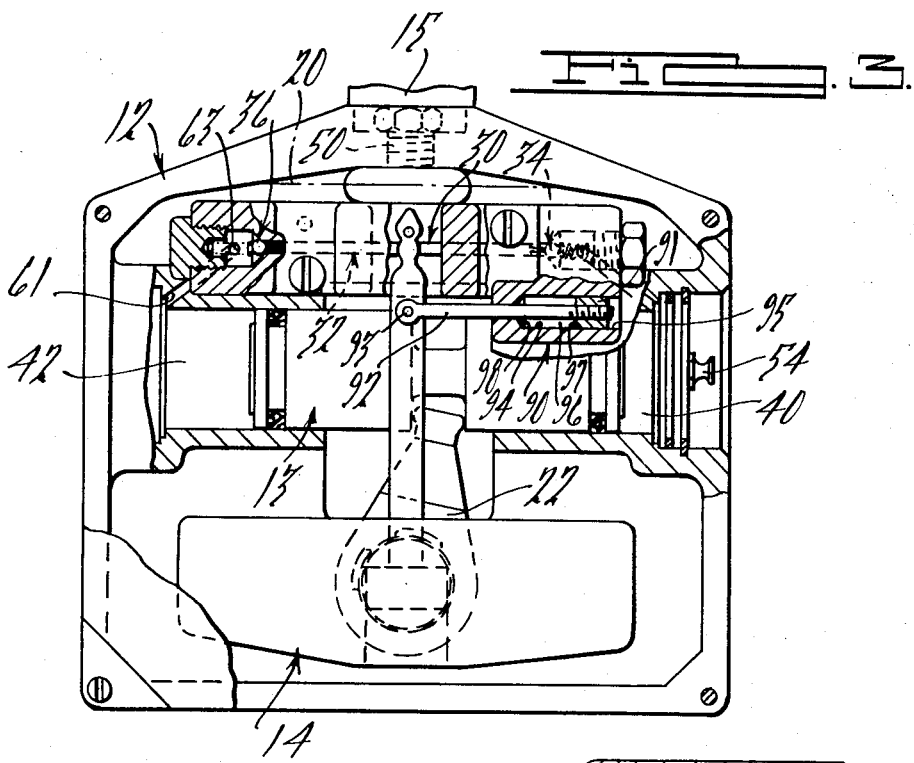
FIG. 3 illustrates a view of the structure of FIGS. 1 and 2 after the self leveling assembly has corrected its positioning of the tractor seat back to a level position relative to the same inclined terrain of FIG. 2.

The operating force for the displacement of fluid across the closed loop to the other fluid chamber 42 at the left end of the single opposed piston 13 is the weight of the person sitting on the tractor seat 10 which person tends to slightly shift his weight to the left in order to achieve a generally vertical upright position. This operating force thus leads to the displacement of the fluid from the chamber 40 around the closed loop such that it passes through the cross over conduit 68 and flows through the conduit 67, and then through the left hand check valve 36 and thus through the left hand conduits 65, 61 into the fluid chamber 42 on the left side of the piston 13. When this directional flow of fluid through the closed loop occurs the piston 13 is displaced to the right relative to the leveling unit 12 and the leveling unit 12 is allowed to rotate back to the leveled position about the fixed abutment member 22 which represents the vertical axis of the tractor during continued movement of the tractor along the inclined slope originally encountered as in FIG. 2, with the corrected position of the leveling unit 12, piston 13, and pendulum actuator 14 being as shown in FIG. 3 after the tractor seat 10 has leveled out. Once the tractor seat does level out it is seen that the pendulum returns to a straight up and down position as shown in FIG. 3 and both the push rod members 30 and 32 are again centrally located and out of contact with the right and left hand check valves 34 and 36. Upon the check valves returning to their closed position it is seen that the flow of fluid within the closed loop is prevented and the piston 13 is locked in a position as shown in FIG. 3 and thus the leveling unit 12 is also fixed in the position shown in FIG. 3 to maintain the tractor seat 10 in a level position.

It is to be understood that the self-contained leveling unit 12 when returning to the level position as shown in FIG. 3 (from the tilted position initially encountered as shown in FIG. 2) overcomes any tendency to hunt for its final level position due to the incorporation in the structure of this invention of a non-symmetrical acting damping mechanism generally designated 90, as best shown in FIG. 3. The damping mechanism is comprised of a damper piston 91 attached to a damper rod 92, with the damper rod 92 being pivotally connected at 93 to the pendulum 14. The damper piston 91 slides back and forth within the damper piston chamber 94 and the chamber 94 is in communication at its right hand end with the fluid reservoir 20 within the leveling unit 12.

Operation of the damping mechanism 90 is as follows. Movement of the damper piston 91 to the left within the chamber 92 permits the oil to flow freely into the chamber at the point 95 where the chamber communicates with the fluid reservoir. However once the damper piston 91 is moved full left within its chamber 94 return movement of the damper piston in a rightward direction is at a slightly different rate because when the damper piston moves from full left to full right within the chamber 94 it is in effect creating a suction or vacuum within the space 96 formed within the chamber between the inside wall 97 of the piston 91 and the left hand 98 of the chamber 94. The fact that the damping mechanism 90 operates at a different rate or is non-symmetrically acting in different directions precludes the possibility of synchronous oscillatory motion on the part of the pendulum whereby the check valve ports would be opened in frequency and thus the seat is prevented from going back and forth freely which would prevent or delay the seat from quickly reaching its desired level position.

From the above description the advantages of this invention should be fairly apparent. In particular however certain advantages of this invention are specifically described as follows. First, the self leveling assembly for use on tractor seats and the like as described above is highly advantageous in design due to the fact that the self leveling assembly is all enclosed and self-contained within a single unit which can be simply mounted on a tractor chassis through a mounting connection at one end of the unit with the tractor seat being mounted generally at the opposite end of the unit. This greatly facilitates mounting of the assembly for actual usage. Second, the self leveling assembly in accordance with this invention utilizes a self-contained, sealed, leveling unit which is tamper proof and maintains unexposed numerous parts which on prior art devices were externally mounted and subject to various types of breakage and other malfunctioning. Third, the single opposed piston design as described hereinabove provides greater accuracy in plumbing back to a vertical position, that is in leveling of the tractor seat, due to the negligible amount of mechanical linkages involved in the self leveling system of this invention. Fourth, the closed loop fluid system used in the structure of this invention affords a more assurable solid action in returning the seat to a level position because in effect the closed loop fluid system used herein is totally enclosed in a self-contained unit and the system in effect gives a fluid linkage which does not stretch or compress, so to speak, as would be the case in the use of mechanical linkages either wholly or partly as in the prior art devices. Fifth, the check valve configuration for filling the closed loop fluid circuit in the structure of this invention assures a greater reliability in filling of the closed loop thus avoiding trapped air or gases. Sixth, the non-symmetrical acting damping mechanism disclosed in this invention precludes the possibility of oscillatory motion wherein the check valve ports would be subject to opening in frequency which would allow the seat to unduly pass back and forth across the desired level position; and, this in effect means that external rough movement of the tractor will not cause sympathetic movement of the check valves which would cause the seat to unnecessarily hunt for the level position.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A self leveling seat assembly for a tractor vehicle and the like,
    comprising, self contained leveling unit,
  a seat mounted on one part of the unit,
  means on the unit for mounting the unit on the vehicle, said leveling unit being of generally sealed structure and including therewithin,
  a closed, fluid filled, loop,
    single opposed piston means connected in said loop and operable to displace the fluid selectively in either direction within the loop,
    valve means connected in said closed loop in series with the piston means and operable to normally prevent displacement of the fluid in said loop when the seat is substantially level,
    a tilt responsive actuator means operable upon tilting of the seat in either direction to open the valve means and permit the fluid in said loop to be displaced by said piston means in a direction to level said seat and said valve means being further operable to prevent displacement of the fluid in the opposite direction within said loop after the seat reaches the level position,
and wherein said assembly is leveled by an operating force resulting from the weight upon the seat which is connected to the piston means whereby the weight causes the piston means to displace the fluid in the loop in a direction to level said seat, and wherein,
  said leveling unit includes therewithin,
    non-symmetrical damper means connected to said tilt responsive actuator means and operable to prevent synchronous oscillatory motion in the actuator means and thus assist in preventing the valve means from opening and closing in a frequency which would deter the seat from resuming the level position.

2. A self leveling seat assembly for a tractor vehicle and the like,
  comprising,
    self contained leveling unit,
    a seat mounted on one part of the unit,
    means on the unit for mounting the unit on the vehicle,
    said leveling unit being of generally sealed structure and including therewithin,
      a closed, fluid filled, loop,
        single opposed piston means connected in said loop and operable to displace the fluid selectively in either direction within the loop,
        valve means connected in said closed loop in series with the piston means and operable to normally prevent displacement of the fluid in said loop when the seat is substantially level,
        a tilt responsive actuator means operable upon tilting of the seat in either direction to open the valve means and permit the fluid in said loop to be displaced by said piston means in a direction to level said seat and said valve means being further operable to prevent displacement of the fluid in the opposite direction within said loop after the seat reaches the level position,
and wherein said assembly is leveled by an operating force resulting from the weight upon the seat which is connected to the piston means whereby the weight causes the piston means to displace the fluid in the loop in a direction to level said seat, and wherein,
  said leveling unit includes therewithin, fluid reservoir means operable to transmit minor amounts of fluid to and from said closed fluid filled loop through minor amounts of leakage within said loop and thereby gases are prevented from becoming trapped in the loop and lessening the reliability thereof, and
    non-symmetrical damper means connected to said tilt responsive actuator means and operable to prevent synchronous oscillatory motion in the actuator means and thus assist in preventing the valve means from opening and closing in a frequency which would deter the seat from resuming the level position.

3. The invention of claim 2 wherein,
  said piston means is double ended with a fluid chamber at each end thereof,
  said valve means includes two spring biased check valves each one of which communicates with one of said fluid chambers at one end of said piston means,
  said check valves being actuated by rod members which are pushed outwardly in opposite directions from the tilt responsive actuator means.

4. A self leveling assembly for a device required to be kept in a level position relative to a moving base member,
  comprising,
    self contained leveling unit,
    means for mounting the device on one part of the unit,
    means on the unit for mounting the unit on the base member, said leveling unit being of generally sealed structure and including therewithin,
      a closed, fluid filled, loop,
        single opposed fluid displacement means connected in said loop and operable to displace the fluid selectively in either direction within the loop,
        valve means connected in said closed loop in series with the displacement means and operable to normally prevent displacement of the fluid in said loop when the device is substantially level,
        a tilt responsive actuator means operable upon tilting of the device in either direction to open the valve means and permit the fluid in said loop to be displaced by said displacement means in a direction to level said device and said valve means being further operable to prevent displacement of the fluid in the opposite direction within said loop after the device reaches the level position,
and wherein the device is leveled by an operating force resulting from the weight upon the device which is connected to the displacement means whereby the weight causes the displacement means to displace the fluid in the loop in a direction to level the device, and wherein, said leveling unit includes therewithin, non-symmetrical damper means connected to said tilt responsive actuator means and operable to prevent synchronous oscillatory motion in the actuator means and thus assist in preventing the valve means from opening and closing in a frequency which would deter the device from resuming the level position.

5. A self leveling assembly for a device required to be kept in a level position relative to a moving base member, comprising,
self contained leveling unit,
means for mounting the device on one part of the unit,
means on the unit for mounting the unit on the base member, said leveling unit being of generally sealed structure and including therewithin,
a closed, fluid filled, loop,
single opposed fluid displacement means connected in said loop and operable to displace the fluid selectively in either direction within the loop,
valve means connected in said closed loop in series with the displacement means and operable to normally prevent displacement of the fluid in said loop when the device is substantially level,
a tilt responsive actuator means operable upon tilting of the device in either direction to open the valve means and permit the fluid in said loop to be displaced by said displacement means in a direction to level said device and said valve means being further operable to prevent displacement of the fluid in the opposite direction within said loop after the device reaches the level position, and wherein,
said leveling unit includes therewithin, fluid reservoir means operable to transmit minor amounts of fluid to and from said closed fluid filled loop through minor amounts of leakage within said loop and thereby gases are prevented from becoming trapped in the loop and lessening the reliability thereof,
non-symmetrical damper means connected to said tilt responsive actuator means and operable to prevent synchronous oscillatory motion in the actuator means and thus assist in preventing the valve means from opening and closing in a frequency which would deter the device from resuming the level position.

6. The invention of claim 5 wherein,
said piston means is double ended with a fluid chamber at each end thereof,
said valve means includes two spring biased check valves each one of which communicates with one of said fluid chambers at one end of said piston means,
said check valves being actuated by rod members which are pushed outwardly in opposite directions from the tilt responsive actuator means.

7. A self leveling seat assembly for a tractor vehicle and the like,
comprising,
a leveling unit,
a seat mounted on one part of the unit,
means on the unit for mounting the unit on the vehicle,
said leveling unit including,
a closed, fluid filled, loop,
single opposed piston means connected in said loop and operable to displace the fluid selectively in either direction within the loop,
said single opposed piston means being mounted upon
a rocker arm abutment which is fixed relative to the chassis of the vehicle, and with the mounting being made at a position intermediate the ends of the single opposed piston means,
valve means connected in said closed loop in series with the piston means and operable to normally prevent displacement of the fluid in said loop when the seat is substantially level,
a tilt responsive actuator means operable upon tilting of the seat in either direction to open the valve means and permit the fluid in said loop to be displaced by said piston means in a direction to level said seat and said valve means being further operable to prevent displacement of the fluid in the opposite direction within said loop after the seat reaches the level position,
and wherein said assembly is leveled by an operating force resulting from the weight upon the seat which is connected to the piston means whereby the weight causes the piston means to displace the fluid in the loop in a direction to level said seat
through tilting of the piston means relative to its mounting on the rocker arm abutment.

8. The invention of claim 7 wherein,
said leveling unit includes therewithin, fluid reservoir means operable to transmit minor amounts of fluid to and from said closed fluid filled loop through minor amounts of leakage within said loop and thereby gases are prevented from becoming trapped in the loop and lessening the reliability thereof.

9. The invention of claim 8 wherein,
said leveling unit includes therewithin, non-symmetrical damper means connected to said tilt responsive actuator means and operable to prevent synchronous oscillatory motion in the actuator means and thus assist in preventing the valve means from opening and closing in a frequency which would deter the seat from resuming the level position.

10. The invention of claim 9 wherein,
said piston means is double ended with a fluid chamber at each end thereof,
said valve means includes two spring biased check valves each one of which communicates with one of said fluid chambers at one end of said piston means, said check valves being actuated by rod members which are pushed outwardly in opposite directions from the tilt responsive actuator means.

* * * * *